United States Patent
Jung et al.

(10) Patent No.: US 7,540,251 B2
(45) Date of Patent: Jun. 2, 2009

(54) APPARATUS AND METHODS FOR TREATING BALLAST WATER BY USING ELECTROLYSIS OF NATURAL SEAWATER

(75) Inventors: Woo-Chul Jung, Pohang (KR); Kwang-Il Kim, Pohang (KR); Young-Deog Kim, Pohang (KR); Heung-Rak Kim, Kyungjoo (KR)

(73) Assignee: Research Institute of Industrial Science & Technology (KR)

( * ) Notice: Subject to any disclaimer, the term of this patent is extended or adjusted under 35 U.S.C. 154(b) by 129 days.

(21) Appl. No.: 10/583,703

(22) PCT Filed: Dec. 21, 2004

(86) PCT No.: PCT/KR2004/003374

§ 371 (c)(1), (2), (4) Date: Jun. 20, 2006

(87) PCT Pub. No.: WO2005/061394

PCT Pub. Date: Jul. 7, 2005

(65) Prior Publication Data

US 2007/0158208 A1  Jul. 12, 2007

(30) Foreign Application Priority Data

Dec. 22, 2003 (KR) ...................... 10-2003-0094867

(51) Int. Cl.
 *B63B 9/08* (2006.01)
(52) U.S. Cl. ...................................... 114/125
(58) Field of Classification Search ................. 114/125, 114/121
See application file for complete search history.

(56) References Cited

U.S. PATENT DOCUMENTS

| | | | | |
|---|---|---|---|---|
| 4,085,028 A | * | 4/1978 | McCallum | 204/269 |
| 4,129,493 A | * | 12/1978 | Tighe et al. | 204/229.7 |
| 5,358,643 A | * | 10/1994 | McClintock | 210/709 |
| 5,624,535 A | * | 4/1997 | Tsuchikawa et al. | 204/228.2 |
| 6,740,245 B2 | | 5/2004 | Johnson | |
| 6,761,123 B2 | | 7/2004 | Husain et al. | |
| 2004/0099608 A1 | * | 5/2004 | Leffler et al. | 210/704 |
| 2004/0106211 A1 | * | 6/2004 | Kauer et al. | 436/169 |

FOREIGN PATENT DOCUMENTS

| | | |
|---|---|---|
| JP | 06-010169 A | 1/1994 |
| JP | 2001-293474 A | 10/2001 |
| JP | 2003-118681 A | 4/2003 |
| JP | 2003-154994 A | 5/2003 |

\* cited by examiner

*Primary Examiner*—Stephen Avila
(74) *Attorney, Agent, or Firm*—The Webb Law Firm

(57) ABSTRACT

An electrolysis-type apparatus for treating ballast water using NaOCl and a method thereof is provided. The apparatus includes: a ballast tank; an electrolyzer; a first circulation pump; a second circulation pump; and a controller. The ballast tank is installed in a ship to store seawater. The electrolyzer is connected with the ballast tank and electrolyzes the seawater. The circulation pumps are installed to allow the ballast water to flow into the electrolyzer and to discharge the electrolyzed water containing NaOCl to the ballast tank. The controller supplies power to the electrolyzer so as to control an NaOCl density and controls the circulation pumps. The apparatus and the method safely treat the seawater. Thus, environment pollution and ecosystem destruction can be minimized.

19 Claims, 5 Drawing Sheets

APPARATUS AND METHODS FOR TREATING BALLAST WATER BY USING ELECTROLYSIS OF NATURAL SEAWATER

TECHNICAL FIELD

The present invention relates to an electrolysis-type apparatus and a method thereof for treating ballast water using NaOCl, and more particularly, to an electrolysis-type apparatus and a method thereof capable of electrolyzing seawater taken into the ballast tank, generating NaOCl from NaCl contained in the seawater to kill harmful plankton within the taken-in seawater and preventing the secondary pollution due to discharged water since discharged NaOCl is naturally decomposed by an ultraviolet of sunlight.

BACKGROUND ART

A study for solving problems in a related art processing method that uses medication, filtering and so on is under progress in order to cope with environment destruction due to seawater taken into and discharged from the ballast tank of large-scale ships and ecosystem disturbance due to inflow of organisms to the foreign zone.

In case of most of large-scale ships including an oil tanker and a large-scale freighter currently in use, a ballast tank is provided to a lower portion of the ship in order to secure stability and a balance of the ship. The ballast tank is used in balancing the ship by taking in a predetermined amount of seawater in order to complement loss of balance of the ship in case there is no cargo in the ship.

At this point, an amount of the seawater taken in is set on the basis of a ship's size, namely, displacement. In case of a large-scale ship, frequently seawater more than ten thousand tons is taken in. In that case, marine microorganisms are contained in the taken-in seawater. In case a ship takes in seawater in a country or zone where the ship comes alongside a quay and then discharges the seawater in a foreign country or zone, the marine microorganisms taken in the seawater might propagate to the foreign zone.

The above-mentioned migration of the marine microorganisms does not nearly occur in the natural world but generates ecosystem disturbance such as a change in a representative species of living creatures and a red tide, thus causing very severe problems to the ecosystem.

To cope with these problems, methods for filtering the taken-in seawater with a filter or eliminating the marine microorganisms by inputting medicines into the taken-in seawater have been used to eliminate the microorganisms inside the ballast tank. In case of the method that uses the filter, and amount of the taken-in seawater is reduced, thus a problem in treating capacity. Further, since the mesh of a filter is limited, a complete treating of the microorganism is not performed.

Further, in case of inputting medicines, the marine microorganisms that come in can be eliminated but poisonous chemical material remaining inside the tank contaminates the neighboring zone when the seawater is discharged, whereby environment destruction is caused. Thus, currently, use of the medicines is regulated.

SUMMARY OF THE INVENTION

One object of the present invention is to provide an electrolysis-type apparatus and a method thereof for treating ballast water which are safer and easier than a related art method that uses medication by suggesting a solution that circulates seawater taken into a ballast tank and converts NaCl components contained in the seawater into NaOCl using an electrolyzer to kill marine microorganisms, and that solves a problem of a secondary pollution due to discharged seawater using phenomenon that NaOCl contained in the discharged seawater is converted back to NaCl under influence of an ultraviolet of sunlight.

Another object of the present invention is to provide an electrolysis-type apparatus and a method thereof for treating ballast water capable of efficiently killing marine microorganisms through a very simple structure.

In order to achieve the above objects, there is provided an electrolysis-type apparatus for treating ballast water in a ship, the apparatus comprising: a ballast tank installed in a lower portion of the ship, for storing seawater; an electrolyzer connected with the ballast tank, for electrolyzing the seawater; a first circulation pump installed between the ballast tank and the electrolyzer, for allowing the ballast water to flow into the electrolyzer; a second circulation pump for discharging the electrolyzed seawater containing NaOCl from the electrolyzer to the ballast tank; and a controller for supplying power to the electrolyzer so as to control an NaOCl density of the ballast water and controlling the circulation pumps.

The electrolyzer may have an NaOCl density detection sensor in at least one position among an inside of the electrolyzer, an inlet of the ballast tank and a bottom of the ballast tank.

Valves for controlling inflow and outflow amounts of seawater may be installed between the ballast tank and the respective circulation pumps.

The valve may be a solenoid valve.

In one aspect of the present invention, there is provided an electrolysis-type method for treating ballast water in a ship using electrolysis, the method comprising steps of: taking in seawater into a ballast tank; operating a circulation pump to allow the seawater of the ballast tank to flow into an electrolyzer where electrodes for electrolysis are installed; converting, at the electrolyzer, NaCl contained in the seawater into NaOCl through electrolysis; and discharging the seawater containing NaOCl to the ballast tank through a circulation pump.

The present invention may install a NaOCl density detection sensor in order to maintain the NaOCl density constant to control a seawater circulation amount of the electrolyzer or a direct-current-voltage supply depending on the detection results.

In another aspect of the present invention, there is provided an electrolysis-type apparatus for treating ballast water in a ship, the apparatus including: a ballast tank installed in a lower portion of the ship, for storing seawater; an intake pump for taking in seawater and supplying the seawater to the ballast tank; an electrolyzer positioned between the ballast tank and the intake pump, for electrolyzing the seawater supplied to the ballast tank from the intake pump; and a controller for controlling power supplied to the electrolyzer and controlling the intake pump to control an NaOCl density of the seawater contained in the ballast tank.

In further another aspect of the present invention, there is provided an electrolysis-type method for treating ballast water in a ship using electrolysis, the method including steps of: taking in seawater into a ballast tank; passing the taken-in seawater through an electrolyzer where electrodes for electrolysis are installed to generate electrolyzed water containing NaOCl; and allowing the electrolyzed water containing NaOCl to flow into the ballast tank.

BRIEF DESCRIPTION OF THE DRAWINGS

The above objects, other features and advantages of the present invention will become more apparent by describing the preferred embodiments thereof with reference to the accompanying drawings, in which.

DETAILED DESCRIPTION OF THE INVENTION

Figure 1:
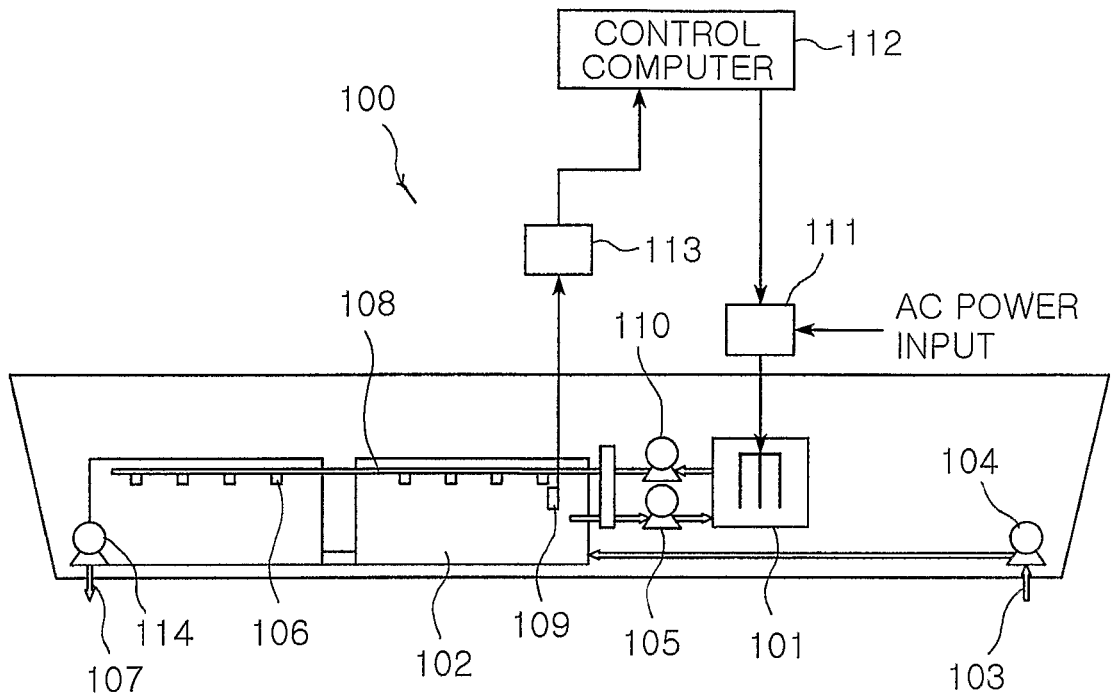
FIG. 1 is a view schematically illustrating a construction of an electrolysis-type apparatus for treating ballast water according to an embodiment of the present invention.

An apparatus for treating ballast water according to the first embodiment of the present invention will be described in more detail with reference to FIGS. 1 and 2.

The apparatus 100 for treating ballast water according to an embodiment of the present invention is generally installed in a lower portion of a ship and circulates part of seawater that has been taken into a ballast tank 102 to make an NaOCl component and returns the NaOCl component back to the ballast tank 102.

The electrolysis-type apparatus 100 for treating ballast water according to the first embodiment includes: an intake inlet 103 and an intake pump 104 for taking in seawater; a discharge outlet 107 and a discharge pump 114 for discharging the seawater; a ballast tank 102 for storing seawater; an electrolyzer 101 connected with the ballast tank 102 for electrolyzing the seawater; a circulation pump 105 installed between the ballast tank 102 and the electrolyzer 101, for having ballast water to flow into the electrolyzer 101; a circulation pump 110 for discharging the ballast water containing NaOCl from the electrolyzer 101; a controller for controlling an NaOCl density, supplying power to the electrolyzer 101, and controlling the respective circulation pumps 105 and 110.

The ballast tank 102 and the electrolyzer 101 have an NaOCl density detection sensor 109 for detecting an NaOCl density installed. Since the present invention controls an amount of the seawater discharged from and flowing into the electrolyzer 101 in order to control the NaOCl density, valves 115 are installed between the ballast tank 102 and the respective circulation pumps 105 and 110. For example, a solenoid valve may be used for the valve 115, which can be automatically controlled.

The electrolyzer 101 artificially electrolyzes the seawater to convert NaCl which is primary material consisting the seawater into NaOCl. The electrolyzer 101 generates sodium gas showing strong corrosiveness at its anode and generates NaOH at its cathode and finally generates NaOCl and hydrogen gas. However, decomposition and joining reactions occur in a different manner depending on a seawater temperature. Since electrolysis reaction in the seawater occurs under a temperature range of 15-30° C., an electrolysis reaction in the seawater is given by the following equation for the most cases:

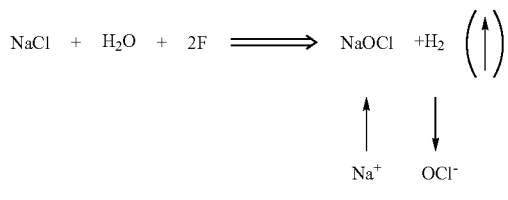

NaOCl generated in the above electrolysis equation is in unstable and excited state itself. Thus, if there exists an ultraviolet, oxygen naturally falls off as time goes on and NaOCl is restored back to NaCl. Further, NaOCl shows strong alkalinity and is thus known to have insecticide and sterilizing effects. When compared with HCl, NaOCl obtained during the electrolysis is known to have about 1.4 times greater such effects than HCl.

All NaCl is not electrolyzed during the above electrolysis and an amount of NaOCl generated is determined by an intensity of power applied. The above reaction is divided into a direct electrolysis reaction and an electrode electrolysis reaction. The direct electrolysis reaction is given by the following equation:

$$NaCl + H_2O + 2F ==>> NaOCl + H_2 (\uparrow)$$

The electrode electrolysis reaction occurring at the electrodes is given by the following equation:

$$\text{Anode reaction: } 2Cl ==> Cl_2 + 2e^-$$

$$\text{Cathode reaction: } 2Na + 2H_2O + 2e^- ==> 2NaOH + H_2 (\uparrow)$$

From these equations, $Cl_2 + 2NaOH ==> NaOCl + NaCl + H_2O$ is obtained. The last equation is a final generation equation for NaOCl obtained from the equations for the electrode electrolysis reaction besides the above equation for the direct reaction.

Figure 2:
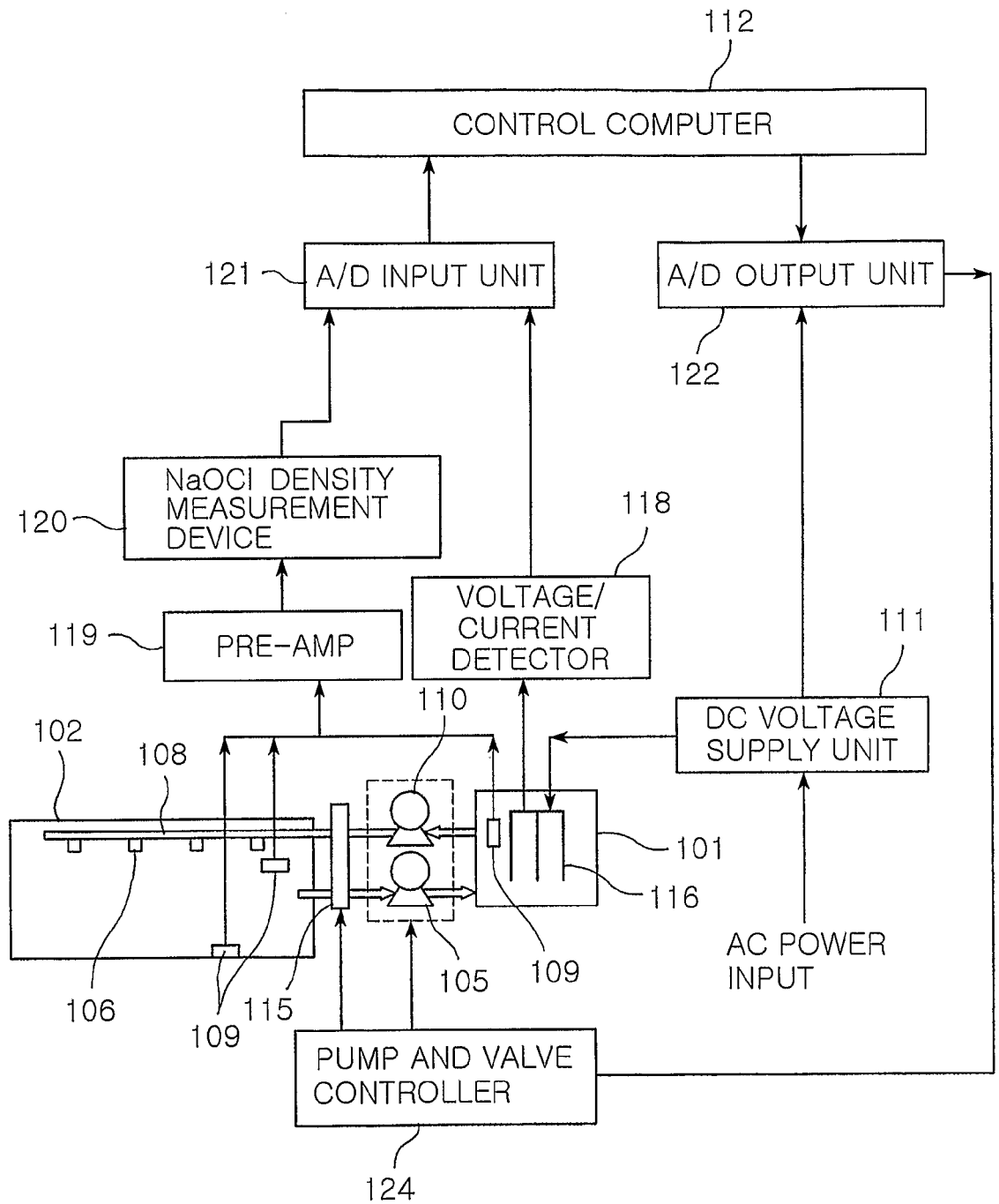
FIG. 2 is a block diagram schematically illustrating a construction of an electrolysis-type apparatus for treating ballast water according to an embodiment of the present invention.

Referring to FIG. 2, the controller includes: a pump and valve controller 124 for controlling the respective circulation pumps 105 and 110, and a solenoid valve 115; a voltage/current detector 118 for detecting a voltage and a current inside the electrolyzer 101; an NaOCl density measurement device 120 for controlling an NaOCl density; a direct-current-voltage supply unit 111 for converting an alternating-current voltage into a direct-current voltage and supplying the direct-current voltage to the electrolyzer 101; an analog/digital (A/D) input unit and output unit 121 and 122 for inputting and outputting a variety of control data; and a control computer 112 for operating and managing the variety of control data to supervise a whole system control.

Further, a pre-amplifier 119 for amplifying a detection signal detected by the NaOCl density detection sensor 109 to transmit the amplified detection signal to the NaOCl density measurement device 120 is installed between the NaOCl density measurement device 120 and the NaOCl density detection sensor 109. The controller controls a supply of a direct-current voltage and the electrolysis using the direct-current-voltage supply unit 111 in order to control the NaOCl density.

Further, a water-level detection device (not shown) can be provided inside the electrolyzer 101 and the ballast tank 102 so that an operator may detect an intake or a discharge of the seawater. Since a general technology in the art can be used in relation to the water-level detection device, detailed description thereof will be omitted.

An electrolysis-type method for treating ballast water will be described below.

Figure 3:
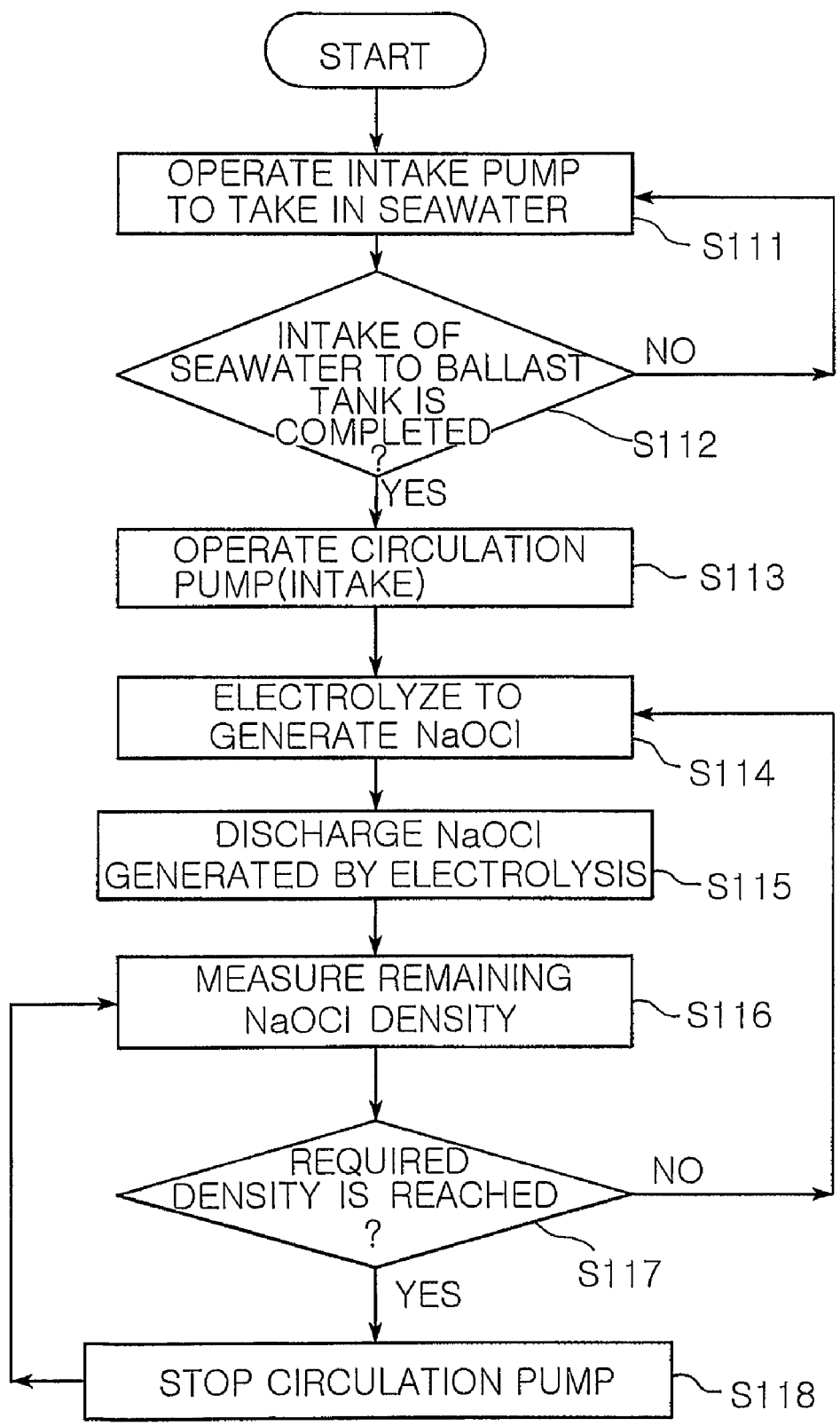
FIG. 3 is a flowchart of an electrolysis-type method for treating ballast water according to an embodiment of the present invention.

Referring to FIG. 3, the seawater is taken into a ballast tank 102 by operating the intake pump 104 (S111). Next, whether the intake of the seawater is completed is judged using the water-level detection device (not shown) provided to the inside of the ballast tank 102 (S112). The seawater in the inside of the ballast tank 102 is taken into the electrolyzer 101 for the seawater where electrodes 116 for electrolysis are installed by operating the circulation pump 105 (S113). Then, an NaCl component of the taken-in seawater is converted into an NaOCl component by electrolysis which uses a direct-current voltage and current in the electrolyzer 101 (S114). Next, the seawater containing the generated NaOCl is discharged by the circulation pump 110 for a discharge in order to supply the seawater to the ballast tank 102 (S115).

At this point, the ballast water is uniformly discharged through a discharge line 108 and a discharge nozzle 106 arranged along an upper surface of the ballast tank 102 so that the generated NaOCl component may be easily diffused inside the ballast tank 102.

Since an amount of NaOCl taken in by the above series of process should maintain a predetermined density in order to kill marine microorganisms, the NaOCl density is measured using the NaOCl density detection sensor 109 (S116). Next, whether the NaOCl density reaches a required density is judged (S117).

If the NaOCl density reaches the required density, the circulation pump is stopped (S118). If the NaOCl density does not reach the required density, the seawater is circulated through the above processes until the NaOCl density reaches the predetermined density.

If the NaOCl density reaches the predetermined density in this manner, killing of the microorganisms is performed and a whole microorganism is naturally treated during a time interval ranging from several days to several ten days for which the ship moves to a destination.

In case the NaOCl density generated during the above processes gets increased too much, corrosion of inside walls of the ballast tank can be generated. In case of finally discharging ballast water at the destination, initial toxicity can be strongly represented. Thus, a method for setting a density constant in generating and circulating processes of NaOCl and monitoring the density is required.

Therefore, considering these points, the present invention installs NaOCl density detection sensors 109 at the electrolyzer 101 where NaOCl is generated, an inlet of the ballast tank 102 where NaOCl is discharged from the nozzle 106 and a bottom of the ballast tank 102, respectively, so as to detect in real time a NaOCl density transition from an amount at a discharge process to a residual amount inside the tank and to properly control a circulation amount of the seawater or a direct-current voltage supply on the basis of the detection results.

A power value for use in the electrolysis to obtain an optimum NaOCl density in the above is determined in direct association with a size and an interval of the electrodes within the electrolyzer 101 and inflow and outflow speeds of the seawater. Therefore, a power for use in the present invention is not limited to a specific power.

In the meantime, according to the present invention, marine microorganisms are effectively killed. Influence density for most of organisms in the seawater by electrolyzed water is shown on Table 1 below. As a result of performing the present invention, it has been checked by a natural eye that organisms causing red tide is completely eliminated within 1-2 minutes after spreading of the electrolyzed water. A density of *Cochlodinium* which has been a population of 7-8 thousand/ml in an actual relevant sea area has approached almost zero after four hours elapse, showing high relief efficiency. If the NaOCl component density required by the electrolyzed water is controlled, complete elimination of marine microorganisms is achieved.

TABLE 1

Influence density of NaOCl in electrolyzed water on marine ecosystem for respective nutrition steps

| Marine organism groups | | Influence density (ppm) |
|---|---|---|
| Protista | *Oxyrrhis marina* | 0.3 |
| | *Polykrikos kofodidii* | 0.75-1.0 |
| | *Strombidinopsis* sp | 0.75-1.0 |
| | *Acartia* spp.(Copepoda) | 2.0 |
| Zooplankton | *Pseudodiaptomus* spp.(Copepoda) | 10-20 |
| Benthic fauna larva | Artemia larva(*Kugenumaenis*) | 30-50 |
| | Barnacle larva | 50 |
| Seaweeds spore | *Borphyra seriata*, *Ulva pertusa*, Brown seaweed | 0.1-0.3 |
| Adult seaweeds | *Borphyra seriata*, *Ulva pertusa* | 1.0-1.5 |
| Adult benthic fauna | Tapes *philippinarum*, Giant pacific oyster, *Pachygrapsus* crassipes | 20 or more |
| Fish | Bastard halibut fry, *sebastes schlegeli* fry | 2-5 |

Figure 4:
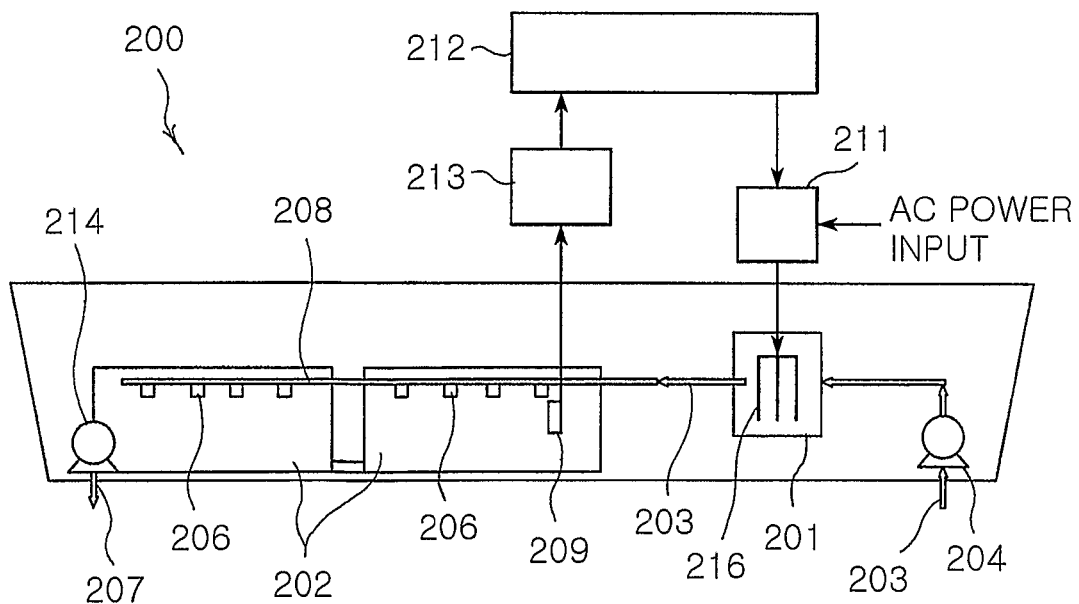
FIG. 4 is a view schematically illustrating a construction of an electrolysis-type apparatus for treating ballast water according to a modified embodiment of the present invention.
Figure 5A:
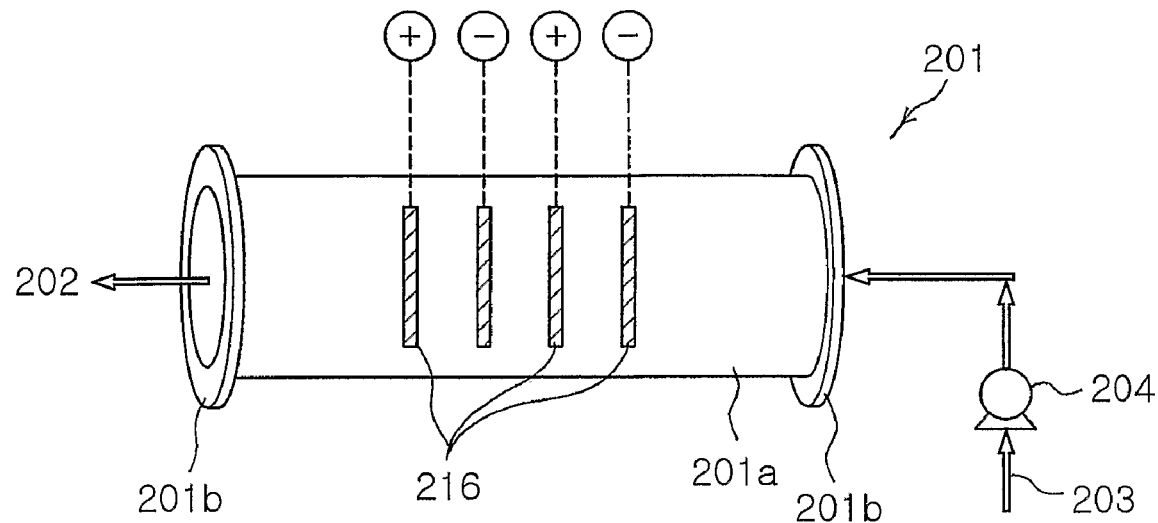
FIGS. 5A and 5B are views illustrating detail constructions of an electrolyzer provided to the electrolysis-type apparatus for treating ballast water illustrated in FIG. 4.
Figure 5B:
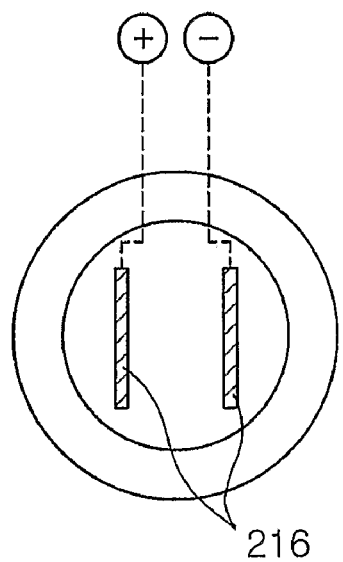

FIGS. 4 and 5 illustrate an electrolysis-type apparatus for treating ballast water having a structure different from the structure of FIGS. 1 and 2 according to the present invention.

The apparatus 200 for treating ballast water is installed in a lower portion of a ship. The apparatus has a structure such that the seawater flows into the ballast tank 202 after NaOCl component is generated in the seawater by passing the seawater through the electrolyzer 201.

The electrolysis-type apparatus 200 for treating ballast water according to the present embodiment includes: an intake inlet 203 and an intake pump 204 for taking in seawater; a discharge outlet 207 for discharging the seawater; a ballast tank 202 for storing the seawater; an electrolyzer 201 connected with the ballast tank 202, for electrolyzing the seawater; a pipe 203 for connecting the ballast tank 202 with the electrolyzer 201; and a controller for detecting an NaOCl density in the ballast tank 202, supplying a power to the electrolyzer 201, controlling the same and automatically controlling these operations.

The ballast tank 202 and/or the electrolyzer 201 have an NaOCl density detection sensor 209 for detecting an NaOCl density installed. Further, a valve (not shown) to be remotely opened/closed, if necessary, can be installed in the pipe 203 between the electrolyzer 201 and the ballast tank 202.

For example, the valve preferably adopts a solenoid value that can be automatically controlled. As described with reference to FIG. 2, the controller includes: a voltage/current detector for detecting a voltage and a current inside the electrolyzer 201; a direct-current-voltage supply unit 211 for supplying a direct current voltage to the electrolyzer 201; an analog/digital (A/D) input unit and an output unit for inputting and outputting a variety of control data; a pump and valve controller for automatically controlling a variety of pumps and valves; and a control computer 212 for operating and managing the variety of control data to supervise a whole system control.

Further, since the electrolysis-type apparatus 200 for treating ballast water directly electrolyzes the seawater using the electrolyzer 201 to generate NaOCl and supplies the electrolyzed water to the ballast tank 202, the circulation pumps 105 and 110 can be omitted unlike the structure of the first embodiment of the present invention described with reference to FIGS. 1 and 2. Therefore, the apparatus of a simpler structure can be realized.

Referring to FIG. 5, the electrolyzer 201 used in the present embodiment may have a body 201a of a cylindrical cavity shape and both ends of the body 201a can be connected, in a joining manner using a flange 201b, with the pipe 203 facing the ballast tank 202 from the intake pump 204.

Further, a plurality of electrodes of cathodes and anodes 216 are arranged in the cylindrical-body 201a of the electrolyzer 201. The electrodes 216 are electrically connected with the direct-current-voltage supply unit 211 and the direct-current power is supplied, so that electrolysis of the seawater may be performed.

Further, the pipe 203 uniformly discharges the ballast water through a discharge line 208 and a discharge nozzle 206 arranged along a top side of the ballast tank 202 so that the NaOCl component generated at the electrolyzer 201 may be easily diffused inside the ballast tank 202.

In addition, the apparatus 200 for processing the ballast water has a water-level detection device (not shown) inside the electrolyzer 201 and the ballast tank 202 so that an operator may detect a current state of the seawater. Since a general technology in the art can be used in association with the water-level detection device, detailed description thereof will be omitted.

An electrolysis-type method for treating ballast water according to a modified embodiment of the present invention will be described below.

Figure 6:
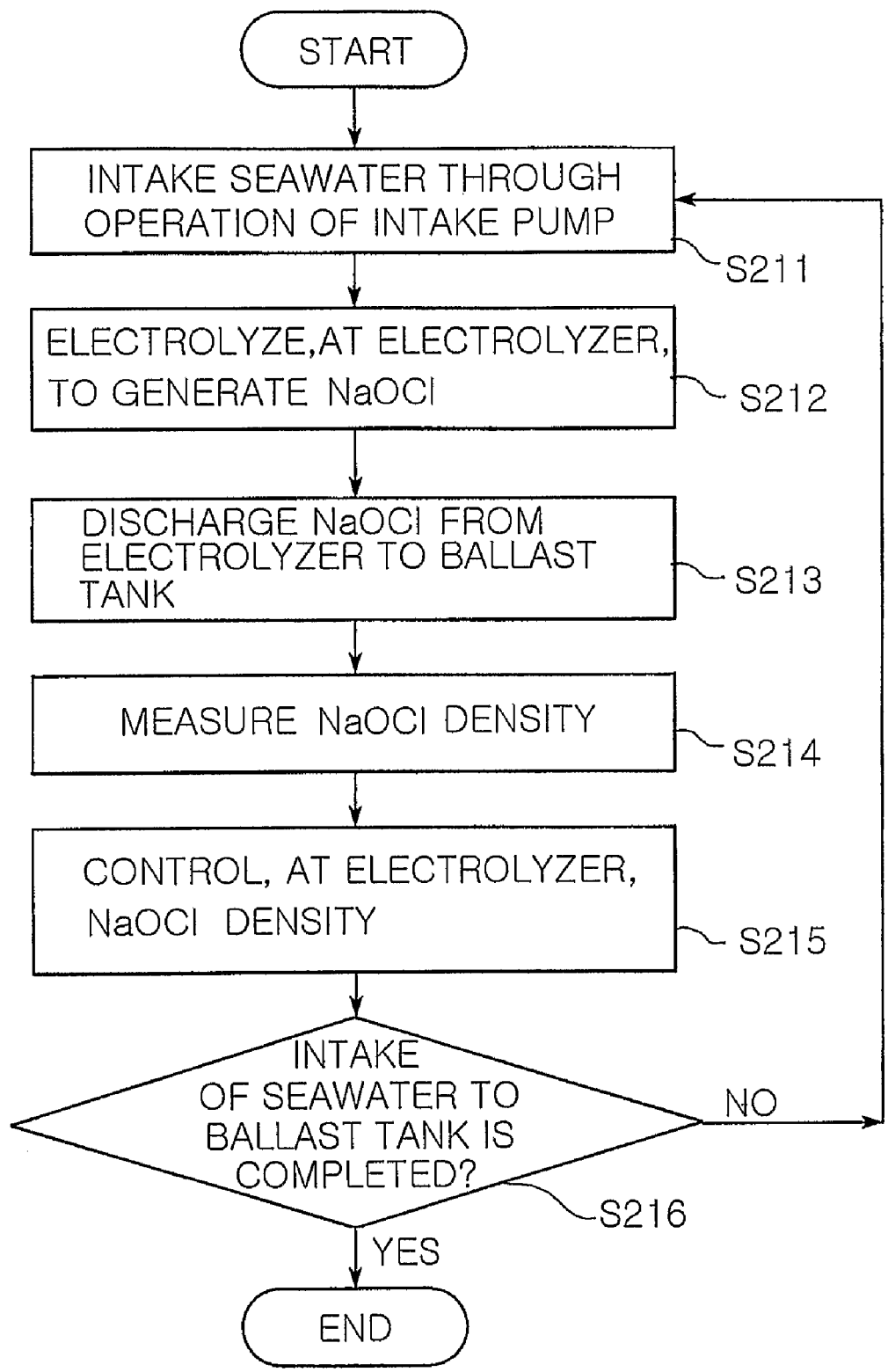
FIG. 6 is a flowchart of a method for treating ballast water according to a modified embodiment of the present invention.

Referring to FIG. 6, the step of taking seawater into the ballast tank 202 is performed first according to the method (S211). In the step of S211, the seawater is taken in by operating the intake pump 204.

Next, the step of passing the taken-in seawater through the electrolyzer 201 where the electrodes 216 for the electrolysis are installed to generate the electrolyzed water containing NaOCl is performed (S212). Then, in the taken-in seawater, the NaCl component is converted into the NaOCl component in the electrolyzer 201 by the electrolysis, which uses the direct-current voltage and current.

Next, the step of discharging the electrolyzed water containing the generated NaOCl to the ballast tank 202 is performed (S213). At this point, the ballast water is uniformly discharged through a discharge line 208 and a discharge nozzle 206 arranged along the top side of the ballast tank 202 so that the generated NaOCl component may be easily diffused inside the ballast tank 202.

Since an amount of NaOCl taken in through the above series of process should maintain a predetermined density in order to kill marine microorganisms, the step of measuring the NaOCl density using the NaOCl density detection sensor 209 is performed (S214).

After that, the step of controlling, at the electrolyzer 201, the direct-current voltage and current on the basis of the measured NaOCl density and adjusting, at the intake pump 204, an inflow amount of the seawater to control the NaOCl density until the the NaOCl density reaches a required density, is performed (S215).

Next, at the step of S216, whether the intake of the seawater has been completed is judged using the water-level detection device (not shown) provided inside the ballast tank 202. At the step of S216, the intake pump 204 is operated until the ballast water reaches a desired intake amount inside the ballast tank 202. If the seawater reaches a desired intake amount, the operation of the intake pump 204 is stopped.

If the seawater is taken in so that the desired NaOCl density may reach the predetermined density in this manner, killing of the microorganisms is performed and whole microorganisms are naturally exterminated during a time interval ranging from several days to several ten days for which the ship moves to a destination.

In the meantime, according to the present embodiment, it is, of course, possible to set in advance a voltage, a current, and a seawater amount so that an optimum target NaOCl density can be obtained in the electrolyzer and to supply the electrolyzed water into the ballast tank using the above set values, and to have the NaOCl density not separately controlled during the process.

A power value for use in the electrolysis is determined in direct association with a size and an interval of the electrodes within the electrolyzer 201 and inflow and outflow speeds or amounts of the seawater. Therefore, a power or an inflow amount of the seawater for use in the present invention is not limited to a specific power or a specific inflow amount.

Although the preferred embodiments of the present invention have been disclosed for illustrative purpose, those skilled in the art will appreciate that various modifications, additions and substitutions can be made without departing from the scope and spirit of the invention as defined in the accompanying claims. Therefore, the scope of the invention is defined not by the detailed description of the invention but by the appended claims, and all differences within the scope will be construed as being included in the present invention.

As described above, since the present invention makes it possible to safely treat the seawater by solving the problems represented in the related art for processing the ballast water, environment pollution and ecosystem destruction can be minimized.

Further, according to the present invention, it is possible to kill marine microorganisms through a very simple structure in a very efficient manner.

The invention claimed is:

1. An apparatus for treating ballast water in a ship, the apparatus comprising:
   a ballast tank installed in a lower portion of the ship, for storing seawater;
   an electrolyzer connected with the ballast tank, for electrolyzing the seawater;
   a first circulation pump installed between the ballast tank and the electrolyzer, for allowing the ballast water to flow into the electrolyzer;
   a second circulation pump for discharging the electrolyzed seawater containing NaOCl from the electrolyzer to the ballast tank; and
   a controller controlling a direct-current voltage supply to the electrolyzer and controlling the circulation pumps so as to adjust an NaOCl density of the ballast water.

2. The apparatus of claim 1, wherein an NaOCl density detection sensor is installed in at least one position selected among an inside of the electrolyzer, an inlet of the ballast tank and a bottom of the ballast tank.

3. The apparatus of claim 1, further comprising valves for controlling inflow and outflow amounts of the seawater installed between the ballast tank and the respective circulation pumps.

4. The apparatus of claim 3, wherein each of the valves is a solenoid valve.

5. The apparatus of claim 1, wherein the controller comprises a direct-current voltage supply unit for converting an alternating-current voltage into a direct-current voltage and supplying the direct-current voltage to electrodes of the electrolyzer.

6. A method for treating ballast water in a ship using electrolysis, the method comprising steps of:
   taking in seawater into a ballast tank;
   operating a circulation pump to allow the seawater of the ballast tank to flow into an electrolyzer where electrodes for electrolysis are installed;
   converting, at the electrolyzer, NaCl contained in the seawater into NaOCl through electrolysis;
   discharging the seawater containing NaOCl to the ballast tank through a circulation pump;
   measuring an NaOCl density to judge whether the NaOCl density reaches a required density;
   if the density reaches the required density, stopping the circulation pump; and
   if the density does not reach the required density, circulating the ballast water until the density reaches the required density.

7. The method of claim 6, wherein an NaOCl density detection sensor is installed in order to maintain an NaOCl density constant to control a seawater circulation amount of the electolyzer or a direct-current voltage supply depending on the detection results.

8. The method of claim 6, wherein the step of measuring the NaOCl density is performed on at least one point among an inside of the electrolyzer, an inlet of the ballast tank and a bottom of the ballast tank.

9. The method of claim 6, further comprising the step of, after the step of taking in:
   judging whether the intake of the seawater is completed using a water-level detection device provided to an inside of the ballast tank.

10. An apparatus for treating ballast water in a ship, the apparatus comprising:
    a ballast tank installed in a lower portion of the ship, for storing ballast water;
    an intake pump for taking in seawater and supplying the seawater to the ballast tank so as to use for the ballast water;
    an electrolyzer has a body of a cavity shape, positioned between the ballast tank and the intake pump, and both side ends of the body are respectively connected by a pipe extended to the intake pump and the ballast tank, for electrolyzing the seawater supplied to the ballast tank from the intake pump; and
    a controller controlling a direct-current voltage supply to the electrolyzer and controlling the intake pump so as to adjust an NaOCl density of the ballast water contained in the ballast tank.

11. The apparatus of claim 10, wherein the pipes connect between the ballast tank and the body and between the body and the intake pump in a manner of flange-joining.

12. The apparatus of claim 10, wherein the body is of a cylindrical shape.

13. The apparatus of claim 10, wherein the body of the electrolyzer has a plurality of electrodes consisting of anodes and cathodes arranged in its inside and the electrodes are electrically connected with a direct-current-voltage supply unit so that a direct-current power converted from an alternating current is supplied and electrolysis of the seawater is performed.

14. The apparatus of claim 10, wherein the pipe uniformly discharges the electrolyzed seawater through a discharge line and a discharge nozzle arranged along a top side of the ballast tank so that the generated NaOCl component is easily diffused inside the ballast tank.

15. The apparatus of claim 10, wherein at least one of the ballast tank and the electrolyzer has an NaOCl density detection sensor for detecting an NaOCl density.

16. A method for treating ballast water in a ship using electrolysis, the method comprising steps of:
    taking in seawater by an intake pump for storing ballast water in a ballast tank;
    passing the taken-in seawater through an electrolyzer where electrodes for electrolysis are installed to generate electrolyzed water containing NaOCl;
    allowing the electrolyzed water containing NaOCl to flow into the ballast tank;
    measuring an NaOCl density from the ballast water in the ballast tank;
    controlling the NaOCl density in the ballast water until the density reaches a required density by adjusting supply of a direct-current voltage to the electrolyzer and adjusting an intake amount of the seawater using an intake pump depending on the measuring results.

17. The method of claim 16, further comprising steps of, after the step of controlling the NaOCl density in the ballast water:
    judging whether the intake of the seawater is completed using a water-level detection device provided to an inside of the ballast tank; and
    operating the intake pump until the seawater reaches a desired intake amount.

18. The method of claim 16, wherein the step of measuring the NaOCl density is performed using an NaOCl density detection sensor positioned in the ballast tank.

19. The apparatus of claim 2, further comprising valves for controlling inflow and outflow amounts of the seawater installed between the ballast tank and the respective circulation pumps.

* * * * *